US009224276B2

(12) United States Patent
Arai

(10) Patent No.: US 9,224,276 B2
(45) Date of Patent: Dec. 29, 2015

(54) WRITING UNDERLAY THAT GENERATES AWAKENING EFFECT

(76) Inventor: Chishinn Arai, Minokamo (JP)

( * ) Notice: Subject to any disclaimer, the term of this patent is extended or adjusted under 35 U.S.C. 154(b) by 183 days.

(21) Appl. No.: 13/997,141

(22) PCT Filed: Dec. 14, 2011

(86) PCT No.: PCT/JP2011/078867
§ 371 (c)(1),
(2), (4) Date: Jul. 21, 2013

(87) PCT Pub. No.: WO2012/086482
PCT Pub. Date: Jun. 28, 2012

(65) Prior Publication Data
US 2014/0002250 A1 Jan. 2, 2014

(30) Foreign Application Priority Data
Dec. 22, 2010 (JP) ................................ 2010-285798

(51) Int. Cl.
*H04B 3/36* (2006.01)
*G08B 6/00* (2006.01)
*B43L 3/00* (2006.01)

(52) U.S. Cl.
CPC .... *G08B 6/00* (2013.01); *B43L 3/00* (2013.01)

(58) Field of Classification Search
CPC .................................. G08B 6/00; B43L 3/00
USPC ...................................................... 340/407.1
See application file for complete search history.

(56) References Cited

FOREIGN PATENT DOCUMENTS

| | | | |
|---|---|---|---|
| JP | 51-112626 | | 10/1976 |
| JP | 51112626 | A * | 10/1976 |
| JP | 7-300828 | | 11/1995 |
| JP | 2001-137134 | | 5/2001 |
| JP | 2007216488 | A * | 8/2007 |
| WO | WO 2011/104966 | A1 | 9/2011 |

OTHER PUBLICATIONS

Microfilm of the specification and drawings annexed to the request of Japanese Utility Model Application No. 167159/1988 (Laid-open No. 86791/1990). Jul. 10, 1990.
Microfilm of the specification and drawings annexed to the request of Japanese Utility Model Application No. 167614/1988 (Laid-open No. 88800/1990), Jul. 13, 1990.
Yoshiyuki Yamazaki et al., Effect of sustaining wakefullness by local vibration stimulus, No. 10-th human interface symposium theses, pp. 225-228.

* cited by examiner

*Primary Examiner* — Kerri McNally
(74) *Attorney, Agent, or Firm* — Wells St. John P.S.

(57) ABSTRACT

Power of concentration of a person at a study time usually declines with the passage of time. However, a practical and concrete method of actively providing a stimulus that makes the person less drowsy, that is, a device that realizes provision of a local exercise stimulus that vibrates a part of a human body, has not been developed. The invention provides an underlay that is used as a stationery product and that generates an awakening effect, the underlay having plural shapes of protrusions and indentations at an upper surface side of the underlay.

4 Claims, 2 Drawing Sheets

WRITING UNDERLAY THAT GENERATES AWAKENING EFFECT

FOREIGN PRIORITY CLAIM

This is a 35 U.S.C. §371 application of, and claims priority to, International Application No. PCT/JP2011/078867, which was filed on Dec. 14, 2011, and published as Publication No. WO 2012/086482 A1, which claims priority to Japan Patent Application No. 2010-285798, which was filed on Dec. 22, 2010, the entirety of all the applications are incorporated herein by reference.

TECHNICAL FIELD

The present invention relates to an underlay that is used as a stationery product, and particularly relates to an underlay that has an awakening effect and can improve power of memory at a study time.

BACKGROUND ART

Power of concentration of a person at a study time usually declines with the passage of time. Accordingly, in many cases, drowsiness comes over the person. To remove the drowsiness, it has been general to take a cup of coffee or take light exercise.

As a method of preventing a fall of wakefulness because of a long-time simple work, there has been studied a method of awakening a person without generating a feeling of discomfort and capable of maintaining wakeful state even when the person is in a long-time monotonous work by controlling a physical stimulus.

As methods of preventing a reduction of wakefulness by controlling a physical stimulus, there are a method of removing a stimulus that makes a person drowsy and a method of actively providing a stimulus that makes a person less drowsy. As the method of actively imparting a stimulus that makes a person less drowsy as the latter method, there has also been progressed a study on the influence of a local exercise stimulus that vibrates a part of a human body, applied to the wakefulness of the person who is in a long-time monotonous work (Non-patent Document 1).

The above study gives a result that the effect of sustaining wakefulness becomes higher when a cycle of the local exercise stimulus that vibrates a part of a human body is shorter (Non-patent Document 1).

Further, it is conventionally known that working five senses at a study time is good to form a brain circuit and establish memory. The “five senses” are five kinds of senses according to a conventional classification, that is, a sense of sight, a sense of hearing, a sense of touch, a sense of taste, and a sense of smell, among many kinds of sensory functions for an animal and a human being to sense an external world. Based on the assumption of this classification, the expression of “five senses” is often used to indicate all senses of a person. In the present specification, the brain circuit refers to a pattern in which information is processed, and much information after being processed is stored in the brain in the form of memory.

On the other hand, the underlay is a collective term of an item that is located beneath an object. The term of underlay is also used to indicate a state of being crushed or overlaid by something such as “trapped under a fallen tree”. However, the underlay, particularly as a common noun, refers to an item that is placed beneath a sheet of paper or the like at a writing time. A material of the underlay that is used for writing with a hard pen such as a pencil and a mechanical pencil is a hard plastic, and is a soft rug (a thick felt that is used as a carpet and the like) for writing with a soft writing brush.

Usually, when a person tries to write letters on a notebook without using an underlay, the paper of the notebook partially sinks and a mark of a writing material may remain on the back of the paper due to a writing pressure of the writer. At the time of writing letters and the like on a sheet of paper, presence of protrusions and indentations beneath the paper or presence of a soft plane beneath the paper makes it difficult to perform the writing. In this case, a hard and smooth sheet is placed beneath the paper to facilitate the writing and set a state of minimizing the mark of the writing material.

A general material is hard polyvinylchloride or a hard paper. In recent years, based on rising concern over environmental issues, underlays that use polypropylene (PP) and polyethylene terephthalate (PET) are becoming general.

PRIOR ART DOCUMENT

Non-Patent Document

Non-patent Document 1: “Effect of sustaining wakefulness by local vibration stimulus, No. 10-th human interface symposium theses, pp. 225-228”, Yoshiyuki Yamazaki, Yoshihisa Okamoto, Syuji Hata (Mazda Motor Corporation).

SUMMARY OF THE INVENTION

Problems to be Solved by the Invention

As a method of actively imparting a stimulus that makes a person less drowsy, there has been progressed a study on the influence of a local exercise stimulus that vibrates a part of a human body, applied to the wakefulness of the person who is in a long-time monotonous work. However, there has not been developed a practical and concrete method of actively imparting a stimulus that makes a person less drowsy as a method of preventing a reduction of wakefulness by controlling a physical stimulus. That is, there has not been developed a device or the like that realizes provision of a local exercise stimulus that vibrates a part of a human body.

On the other hand, a role of the underlay is to facilitate writing and provide a state that a mark of a writing material less remains, by placing a hard and smooth sheet beneath the paper. Protrusions and indentations of an upper surface of the underlay do not provide such an effect and generates an adverse effect on the contrary. Therefore, an underlay that includes protrusions and indentations has not been employed for the underlay as a stationery product.

Means for Solving the Problems

To solve the above problems, the applicant intentionally sets protrusion and indentation parts on the upper surface of an underlay. As a result of intensive studies carried out based on the following knowledge, the applicant has reached the invention of the present application: a vibration that is generated in fingers by protrusions and indentations on an upper surface of the underlay at the writing time becomes a local vibration stimulus that vibrates a part of a human body, and generates the awakening effect; and an acupressure point called Zhongchong that removes drowsiness is present at the base of the nail of the middle finger at the forefinger side to which the local vibration stimulus that vibrates a part of the human body is applied. In the present specification, the upper surface of the underlay refers to a surface of the underlay with which the paper or the like to be written is brought in contact.

The invention of the present application relates to an underlay that generates an awakening effect at the study time, and includes provision of a sheet-shaped product having a protrusion and indentation surface that is to be set on the upper surface of a desk such as a study desk, and provision of a protrusion and indentation surface on the upper surface of the desk such as a study desk, in addition to the underlay that is used as a general stationery product, as technical ideas of the invention.

The present invention provides an underlay that is used as a stationery product and that generates an awakening effect, wherein the underlay has plural shapes of protrusions and indentations on the upper surface of the underlay.

The present invention provides an underlay that is used as a stationery product and that generates an awakening effect, wherein the underlay has plural shapes of protrusions on the upper surface of the underlay.

The present invention provides an underlay that is used as a stationery product and that generates an awakening effect, wherein the underlay has plural shapes of indentations on the upper surface of the underlay.

The present invention provides an underlay that generates an awakening effect, wherein the plural shapes of protrusions and indentations are semispherical shapes.

The present invention provides an underlay that generates an awakening effect, wherein each of the plural shapes of indentations in the semispherical shapes has a diameter of 1 mm to 10 mm and a depth of 0.01 mm to 3 mm, and each of the shapes of protrusions has a diameter of 1 mm to 10 mm and a height of 0.01 mm to 3 mm.

Effects of the Invention

According to the present invention, based on provision of plural fine protrusions and indentations in the whole range of the upper surface of the underlay, a vibration generated from the fine protrusions and indentations at the writing time is transmitted to fingers that hold a writing material, particularly to an acupressure point called Zhongchong that removes drowsiness at the base of the nail of the middle finger at the forefinger side. The awakening effect is generated at the study time by the vibration generated by the protrusions and indentations on the surface of the underlay.

As a further effect, the fine vibration transmitted to fingers by the vibration generated by the plural protrusions and indentations provided in the whole range of the upper surface of the underlay stimulates the sense of touch as one of the five senses of a human being, and also generates slight sound and stimulates the sense of hearing when the writing material passes the protrusion and indentation surface. Although only the sense of hearing is stimulated at an ordinary writing time, the sense of sight, the sense of touch, and the sense of hearing are also stimulated by using the underlay according to the present invention. Such a stimulus becomes a strong stimulus to the brain that requires memory at the study time. Therefore, by using the underlay according to the present invention, a brain circuit is formed, and particularly power of memory improves based on establishment of the memory. There is an effect that the power of memory improves synergistically by a body sensory rhythm based on this vibration in addition to the vibration transmitted to fingers. Because protrusion and indentation parts on the upper surface of the underlay according to the present invention are minute, there does not occur an inconvenience that letters cannot be written at the writing time.

DESCRIPTION OF REFERENCE NUMBERS

Figure 1:
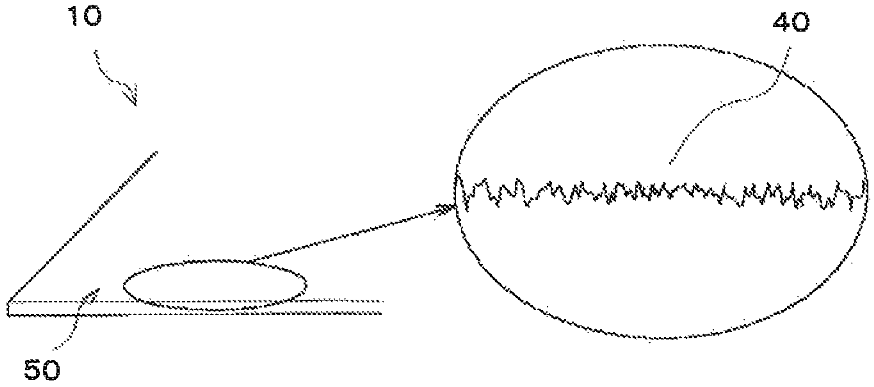
FIG. 1 is a partially-enlarged cross-sectional view of an underlay according to an embodiment of the present invention.

10 Underlay according to the present invention
20 Protrusion part
30 Indentation part
40 Protrusion and indentation part
50 Upper surface of underlay

DETAILED DESCRIPTION OF EMBODIMENTS

Embodiments of the present invention are explained. The present invention is achieved by forming protrusion and indentation parts 40 on an upper surface 50 of an underlay. Shapes of the protrusion and indentation parts 40 may be regular or irregular.

That the shapes of the protrusion and indentation parts 40 are irregular means that various shapes of the protrusion and indentation parts 40 are laid out irregularly on the upper surface 50 of the underlay. In a statistical sense, the irregular layout is intended to provide a state that dimensional values concerning the protrusion and indentation parts 40 have no significant point in a frequency distribution. In the present specification, based on an observation of a cross section of the underlay by arbitrarily cutting the cross section, when a protrusion and indentation surface includes a protrusion and indentation line that looks like forming a part of an arc but the line itself is not regular as a whole, this protrusion and indentation surface is defined as an irregular protrusion and indentation surface. Further, based on an observation of a cross section of the underlay by arbitrarily cutting the cross section, when a protrusion and indentation surface includes a protrusion and indentation line that looks like entirely irregular having no shape of an arc, this protrusion and indentation surface is defined as a random protrusion and indentation surface. That is the random protrusion and indentation surface is included in the irregular protrusion and indentation surface.

Dimensional elements that are to be “set irregular” include diameters of protrusions and indentations, depths of protrusions and indentations, intervals of protrusions and indentations, etc., and one of these may be set irregular. However, an optimum mode capable of exhibiting the awakening effect at a maximum as a practical matter is preferably to obtain a synergistic effect by combining the dimensional elements. For example, when interval dimensions of protrusions and indentations are set irregular, the layout of protrusions and indentations does not generate a regular directionality. Therefore, a vibration that is transmitted to a hand at the writing time cannot be predicted, and this is considered to further enhance the awakening effect.

Further, a ratio of a depth or height dimension to a diameter dimension of the protrusion and indentation parts 40 (a depth of an indentation or a height of a protrusion)/(a diameter of an indentation or a protrusion) is expressed as an "aspect ratio". To enable an actually comfortable writing, the aspect ratio is preferably equal to or smaller than 0.5.

In this way, dimensional values of the protrusion and indentation parts 40 to be formed are designed by studying the items described above. In implementing as these indicators, the following ranges are preferable.

A diameter dimension of a protrusion and an indentation (1 mm to 15 mm)

A depth dimension and a height dimension of a protrusion and an indentation (0.01 mm to 7 mm)

A center-to-center dimension of a protrusion and an indentation (one time to five times of a diameter dimension)

An aspect ratio (equal to or smaller than 0.5)

An underlay 10 that is used as a stationery product in the present invention may be an underlay that has only plural shapes of protrusions at an upper surface side 50 of the underlay, or an underlay that has only plural shapes of indentations at the upper surface side of the underlay, in addition to an underlay that generates the awakening effect by having plural shapes of protrusions and indentations at the upper surface side 50 of the underlay.

By providing a protrusion and indentation surface on the upper surface 50 of the underlay, a vibration generated in fingers by protrusions and indentations on the upper surface 50 of the underlay at the writing time becomes a local vibration stimulus that vibrates a part of a human body, and this stimulus generates the awakening effect. In addition, the acupressure point called Zhongchong that removes drowsiness is present at the base of the nail of the middle finger at the forefinger side to which the local vibration stimulus which vibrates a part of the human body is applied. This acupressure point is stimulated to generate the awakening effect. By using the underlay according to the invention of the present application, the sense of sight, the sense of touch, and the sense of hearing are stimulated. Because such a stimulus becomes a strong stimulus to the brain that requires memory at the study time, a brain circuit is formed, and power of memory improves based on establishment of the memory.

Even when the protrusion and indentation parts 40 are regularly laid out on the upper surface 50 of the underlay, the work of actually writing characters and the like does not become a move of the writing material in one direction. That is, a person usually moves the writing material at various speeds in all directions. Based on this, an irregular stimulus is applied to the acupressure point called Zhongchong that removes drowsiness at the base of the nail of the middle finger at the forefinger side, and this is considered to generate the awakening effect. By using the underlay according to the invention of the present application, the sense of sight, the sense of touch, and the sense of hearing are stimulated. Because such a stimulus becomes a strong stimulus to the brain that requires memory at the study time, a brain circuit is formed, and power of memory improves based on establishment of the memory.

First Embodiment

As shown in FIG. 1, according to the underlay of the present invention, when a cross section of the underlay 10 is observed by performing a press-processing or the like to a whole range of the upper surface 50 of the underlay, the cross section forms a random shape of protrusions and indentations such that a line of protrusions and indentations 40 looks like irregular having no shape of an arc. By providing the random protrusion and indentation surface 40 on the underlay 10, a vibration generated in fingers by protrusions and indentations on the upper surface 50 of the underlay at the writing time becomes a local vibration stimulus that vibrates a part of a human body, and this stimulus generates the awakening effect. In addition, the acupressure point called Zhongchong that removes drowsiness is present at the base of the nail of the middle finger at the forefinger side to which the local vibration stimulus that vibrates a part of the human body is applied. This acupressure point is stimulated to generate the awakening effect. By using the underlay according to the invention of the present application, the sense of sight, the sense of touch, and the sense of hearing are stimulated. Because such a stimulus becomes a strong stimulus to the brain that requires memory at the study time, a brain circuit is formed, and power of memory improves based on establishment of the memory.

Second Embodiment

Figure 2:
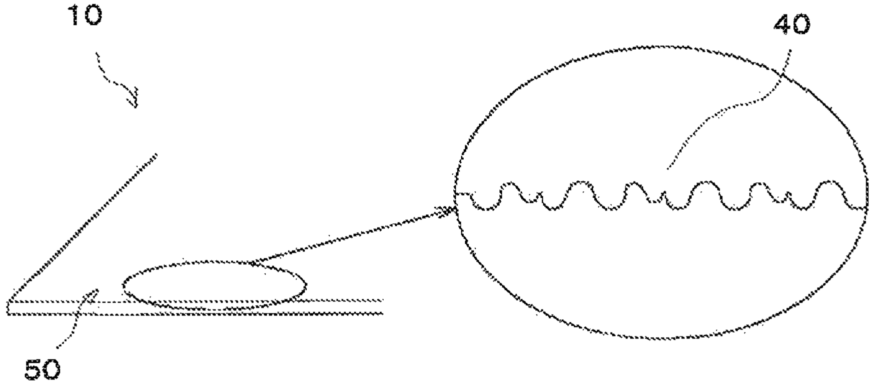
FIG. 2 is a partially-enlarged cross-sectional view of an underlay according to an embodiment of the present invention.

As shown in FIG. 2, according to the underlay of the present invention, when a cross section of the underlay 10 is observed by performing a press-processing or the like to a whole range of the upper surface 50 of the underlay, a protrusion and indentation surface includes a protrusion and indentation line that looks like forming a part of an arc but the line itself is not regular as a whole. That is, by providing an irregular protrusion and indentation surface for the underlay, a vibration generated in fingers by protrusions and indentations on the upper surface of the underlay at the writing time becomes a local vibration stimulus that vibrates a part of a human body, and this generates the awakening effect. In addition, the acupressure point called Zhongchong that removes drowsiness is present at the base of the nail of the middle finger at the forefinger side to which the local vibration stimulus that vibrates a part of the human body is applied. This acupressure point is stimulated to generate the awakening effect. By using the underlay according to the invention of the present application, the sense of sight, the sense of touch, and the sense of hearing are stimulated. Because such a stimulus becomes a strong stimulus to the brain that requires memory at the study time, a brain circuit is formed, and power of memory improves based on establishment of the memory.

Third Embodiment

Figure 3:
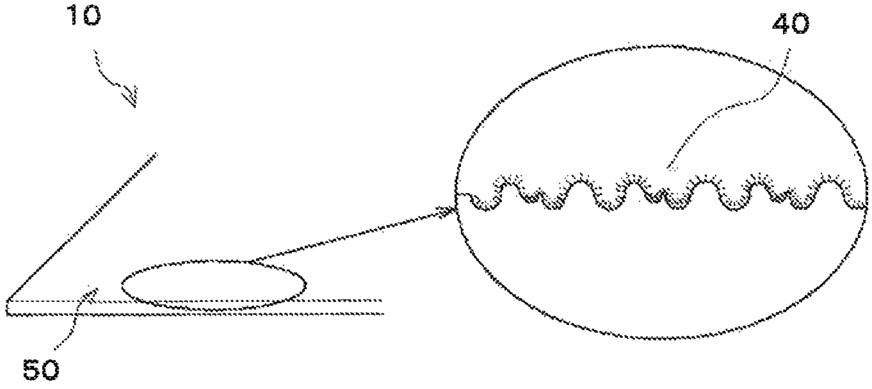
FIG. 3 is a partially-enlarged cross-sectional view of an underlay according to an embodiment of the present invention.

As shown in FIG. 3, in the underlay 10 according to the second embodiment, based on formation of thin tips of hair on the upper surface 50 of the underlay, lengths and hardness of the thin tips of hair entangle the writing material and generate a gentle vibration at the writing time. The vibration generated in fingers by the tips of hair and the protrusions and the indentations of the upper surface 50 of the underlay at the writing time becomes a local vibration stimulus that vibrates a part of a human body, and this generates the awakening effect. In addition, the acupressure point called Zhongchong that removes drowsiness is present at the base of the nail of the middle finger at the forefinger side to which the local vibration stimulus that vibrates a part of the human body is applied.

This acupressure point is stimulated to generate the awakening effect. By using the underlay according to the invention of the present application, the sense of sight, the sense of touch, and the sense of hearing are stimulated. Because such a stimulus becomes a strong stimulus to the brain that requires memory at the study time, a brain circuit is formed, and power of memory improves based on establishment of the memory.

Fourth Embodiment

Figure 4:
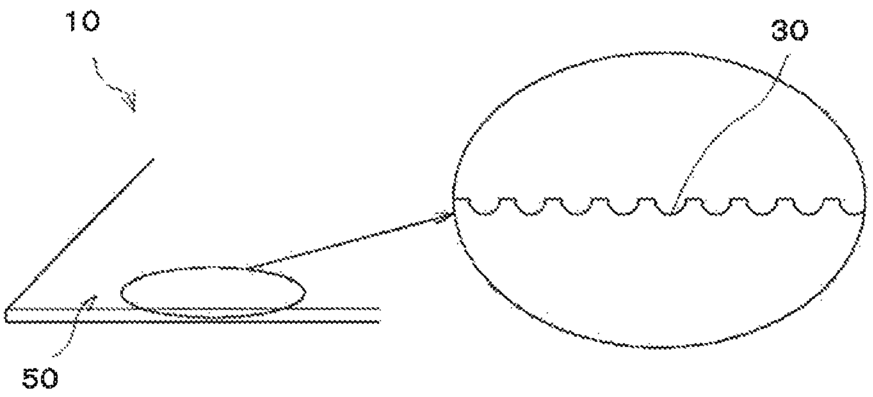
FIG. 4 is a partially-enlarged cross-sectional view of an underlay according to an embodiment of the present invention.

As shown in FIG. 4, according to the underlay of the present invention, indentation parts 30 are regularly laid out by performing a press-processing or the like to a whole range of the upper surface 50 of the underlay. Even when the indentation parts 30 of the underlay are regularly laid out, the work of actually writing characters and the like does not become a move of the writing material in one direction. That is, a person usually moves the writing material in all directions. Based on this, an irregular stimulus is applied to the forefinger, and the awakening effect is considered to be generated. By using the underlay according to the invention of the present application, the sense of sight, the sense of touch, and the sense of hearing are stimulated. Because such a stimulus becomes a strong stimulus to the brain that requires memory at the study time, a brain circuit is formed, and power of memory improves based on establishment of the memory.

Fifth Embodiment

Figure 5:
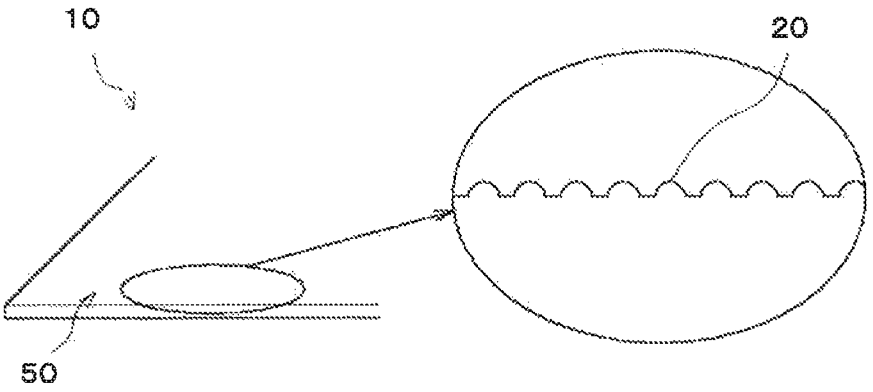
FIG. 5 is a partially-enlarged cross-sectional view of an underlay according to an embodiment of the present invention.

As shown in FIG. 5, according to the underlay of the present invention, protrusion parts 20 are regularly laid out by performing a press-processing or the like to a whole range of the upper surface 50 of the underlay. Even when the protrusion parts 20 of the underlay are regularly laid out, the work of actually writing characters and the like does not become a move of the writing material in one direction. That is, a person usually moves the writing material in all directions. Based on this, an irregular stimulus is applied to the forefinger, and the awakening effect is considered to be generated. By using the underlay according to the invention of the present application, the sense of sight, the sense of touch, and the sense of hearing are stimulated. Because such a stimulus becomes a strong stimulus to the brain that requires memory at the study time, a brain circuit is formed, and power of memory improves based on establishment of the memory.

Sixth Embodiment

Figure 6:
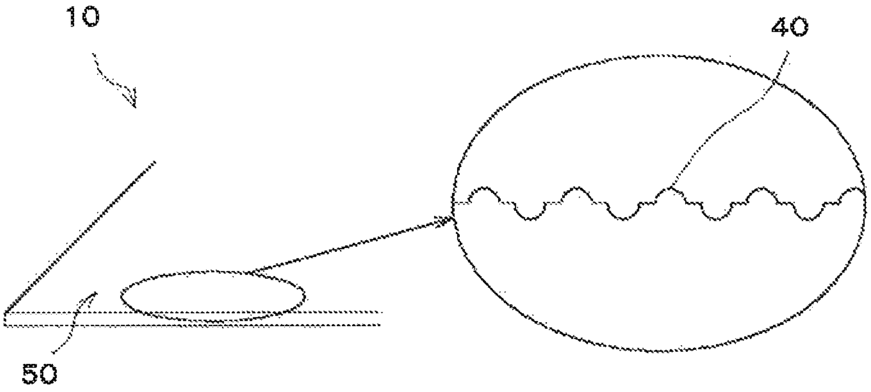
FIG. 6 is a partially-enlarged cross-sectional view of an underlay according to an embodiment of the present invention.

As shown in FIG. 6, according to the underlay of the present invention, the protrusion and indentation parts 40 are regularly laid out by performing a press-processing or the like to a whole range of the upper surface 50 of the underlay. Even when the protrusion and indentation parts 40 of the underlay are regularly laid out, the work of actually writing characters and the like does not become a move of the writing material in one direction. That is, a person usually moves the writing material in all directions. Based on this, an irregular stimulus is applied to the forefinger, and the awakening effect is considered to be generated. By using the underlay according to the invention of the present application, the sense of sight, the sense of touch, and the sense of hearing are stimulated. Because such a stimulus becomes a strong stimulus to the brain that requires memory at the study time, a brain circuit is formed, and power of memory improves based on establishment of the memory.

Seventh Embodiment

In the underlay according to the present invention, methods of forming the protrusion and indentation parts 40 on the upper surface 50 of the underlay also include the following method in addition to the press-processing or the like. Specifically, after a vinyl sheet is laid on a metallic mesh or the like that is set on a base, a protrusion and indentation surface in a mesh shape is formed by vacuumizing a space between the base and the vinyl sheet. Further, a liquid resin is poured into the space by using the protrusion and indentation surface as a mold. In this way, protrusions and indentations can be formed in a mesh shape.

The underlay that generates the awakening effect according to the present invention is not limited to the above embodiments, and various modifications and combinations can be performed within a range of claims and within a range of the embodiments. These modifications and combinations are also included in the range of rights.

INDUSTRIAL APPLICABILITY

The present invention is used in the field relating to an underlay used as a stationery product, and particularly relating to an underlay that has an awakening effect and can improve power of memory at a study time.

The invention claimed is:

1. An underlay that is used as a stationery product and that generates an awakening effect, the underlay having a plurality of shapes of protrusions and indentations on an upper surface of the underlay; and wherein the plurality of the shapes of the protrusions and the indentations are semispherical shapes.

2. The underlay that generates an awakening effect according to claim 1, wherein each of the plurality of shapes of indentations in the semispherical shapes has a diameter of 1 mm to 10 mm and a depth of 0.01 mm to 3 mm, and each of the shapes of protrusions has a diameter of 1 mm to 10 mm and a height of 0.01 mm to 3 mm.

3. An underlay that is used as a stationery product and that generates an awakening effect, the underlay having a plurality of shapes of protrusions and indentations on an upper surface of the underlay;

wherein the plurality of the shapes of the protrusions and the indentations are semispherical shapes; and wherein each of the plurality of the shapes of the indentations in the semispherical shapes has a diameter of 1 mm to 10 mm and a depth of 0.01 mm to 3 mm, and each of the plurality of the shapes of the protrusions has a diameter of 1 mm to 10 mm and a height of 0.01 mm to 3 mm.

4. An underlay that is used as a stationery product and that generates an awakening effect, the underlay having a plurality of shapes of protrusions or indentations that are irregularly formed on an upper surface of the underlay; and wherein the plurality of shapes of protrusions or indentations are semispherical shapes.

* * * * *